United States Patent [19] [11] Patent Number: 4,530,457
Down [45] Date of Patent: Jul. 23, 1985

[54] WAVE-SOLDERING OF PRINTED CIRCUIT BOARDS
[75] Inventor: William H. Down, Brossard, Canada
[73] Assignee: Electrovert Ltd., Canada
[21] Appl. No.: 338,952
[22] Filed: Jan. 12, 1982
[51] Int. Cl.³ .......................... B23K 1/12; H05K 3/34
[52] U.S. Cl. .................................. 228/180.2; 228/37; 228/260; 228/180.1
[58] Field of Search ................. 228/37, 180 R, 180 A, 228/260

[56] References Cited
U.S. PATENT DOCUMENTS 3,921,888 11/1975 Elliot et al. ........................ 228/37 X
4,101,066 7/1978 Corsaro et al. .................... 228/37 X
4,139,881 2/1979 Shimizu et al. ............. 228/180 R X
4,465,219 8/1984 Kondo ............................. 228/260 X

FOREIGN PATENT DOCUMENTS 21622 9/1969 Japan .
112094 12/1981 Japan .
1099330 1/1968 United Kingdom ................. 228/37

Primary Examiner—Kenneth J. Ramsey
Attorney, Agent, or Firm—Darby & Darby

[57] ABSTRACT

Wave soldering apparatus particularly adapted for soldering printed circuit boards which have closely packed chip components adhesively mounted on one side of the boards is described. A novel nozzle assembly is dimensioned to be mounted to the solder supply conduit of a conventional wave soldering reservoir. The nozzle assembly comprises a first nozzle which delivers a turbulent jet to the undersides of the printed circuit boards as they are conveyed over the nozzle assembly, and a second nozzle which delivers a smooth laminar wave through which the undersides of the printed circuit boards immediately subsequently pass. The turbulent jet forces solder into the restricted spaces at which chip component contact pads are located and the smooth wave completes this soldering action by building of additional solder in a manner which discourages the formation of solder "icicles" and bridging.

28 Claims, 4 Drawing Figures

WAVE-SOLDERING OF PRINTED CIRCUIT BOARDS

FIELD AND BACKGROUND OF THE INVENTION

This invention relates to soldering and, more particularly, to the soldering of printed circuit boards by passing them through a standing wave of molten solder.

A known technique for processing printed circuit boards involves the tinning or coating of the printed circuits with solder, by passing the boards with their printed circuit surfaces in contact with a smooth standing wave of molten solder. The boards may also be fluxed, before passing through the standing wave of molten solder, by passing the boards through a standing wave of liquid flux. The standing wave of molten solder is produced by causing an upward flow of molten solder through a nozzle having a substantially rectangular discharge opening extending laterally of the wave, so that the molten solder overflows the edges of the nozzle and returns to a solder tank. The wave may be either one-sided, in which case it overflows only one longer edge of the nozzle, or it may be double-sided, in which case it overflows both longer edges of the nozzle discharge opening.

In recent years so called chip components have been developed by electrical component manufacturers, principally in Japan. These chip components may be manufactured in different ways but the finished product is essentially the same regardless of the manufacturing technique. Each chip component is very small, of the order of several mm, and has a body of molded plastics or ceramic material provided with two or, three in the case of transistors, conductive contact pads. The components are essentially leadless although the contact pads may project outwardly from the body. The chip components are generally rectangular or cylindrical and can be used to replace discrete resistors, capacitors, inductors, diodes and transistors.

The main attractions of the chip components are the dramatic increase in packaging density, reduction in production costs and improved product reliability. In use, the chip components are first bonded to the circuit side of a printed circuit board using an adhesive after which the contact pads of the chips are soldered to the conductive pads on the boards. Severe problems in achieving satisfactory soldering using conventional wave soldering techniques have been encountered. The problems manifested themselves in the occurence of random solder skips (non soldered joints) and bridging. The problems are believed to result from particular characteristics of the chip components and their mounting on the printed circuit boards. In the first place, because of the very high packaging density the spaces between the chip components are often very small and this coupled with the non-wettability of the component bodies tends to repel the solder from locations where it is desired. Furthermore, gases evolved from the adhesives and/or flux tends to cause solderless pockets. Finally, if a chip component happens to be orientated such that one of its contact pads is shielded from the direct flow of solder less solder than necessary will be deposited at that pad.

SUMMARY OF THE INVENTION

In accordance with the present invention a wave soldering technique involving two nozzles in a single nozzle assembly is used. The first nozzle is arranged to provide a turbulent jet of solder which strikes the undersides of the printed circuit boards containing the chip components. The second nozzle is arranged behind the first nozzle and provides a smooth, laminar solder wave which the boards subsequently engage. It is believed that the turbulent jet causes at least some solder to penetrate to all the desired locations on the board despite the resistance to the soldering action as outlined above. The subsequent smooth wave then builds on this initial deposit to complete the soldering action.

To prevent bridging a good run-off of excess solder is necessary and this is preferably achieved by arranging the smooth wave such that most of the wave pours over the entry side of the second nozzle with the remainder pouring out the exit side in a stream running virtually horizontally at the same speed as the circuit boards.

The first nozzle is preferably directed slightly forward in the direction of motion of the boards to fill in the voids which would otherwise appear at trailing contact pads as will be described below in greater detail.

The double nozzle arrangement is configured and dimensioned to fit existing reservoirs which are conventionally fitted with a single pump which is controllable. In order to provide the facility of separate flow control for both nozzles a valve is built into the first nozzle. Thus both nozzles may be controlled separately without the additional expense of a second pump. The facility for separate control is important because the best results may depend on the relative flows through the two nozzles.

Thus, it is an object of the present invention to provide an improved apparatus and method for soldering printed circuit boards particularly such boards carrying chip components.

It is another object of the present invention to provide an improved soldering apparatus which may be retrofitted to existing wave soldering apparatus.

For an understanding of the principles of the invention, reference is made to the following description of a typical embodiment thereof as illustrated in the accompanying drawings.

DESCRIPTION OF THE PREFERRED EMBODIMENT

Figure 1:
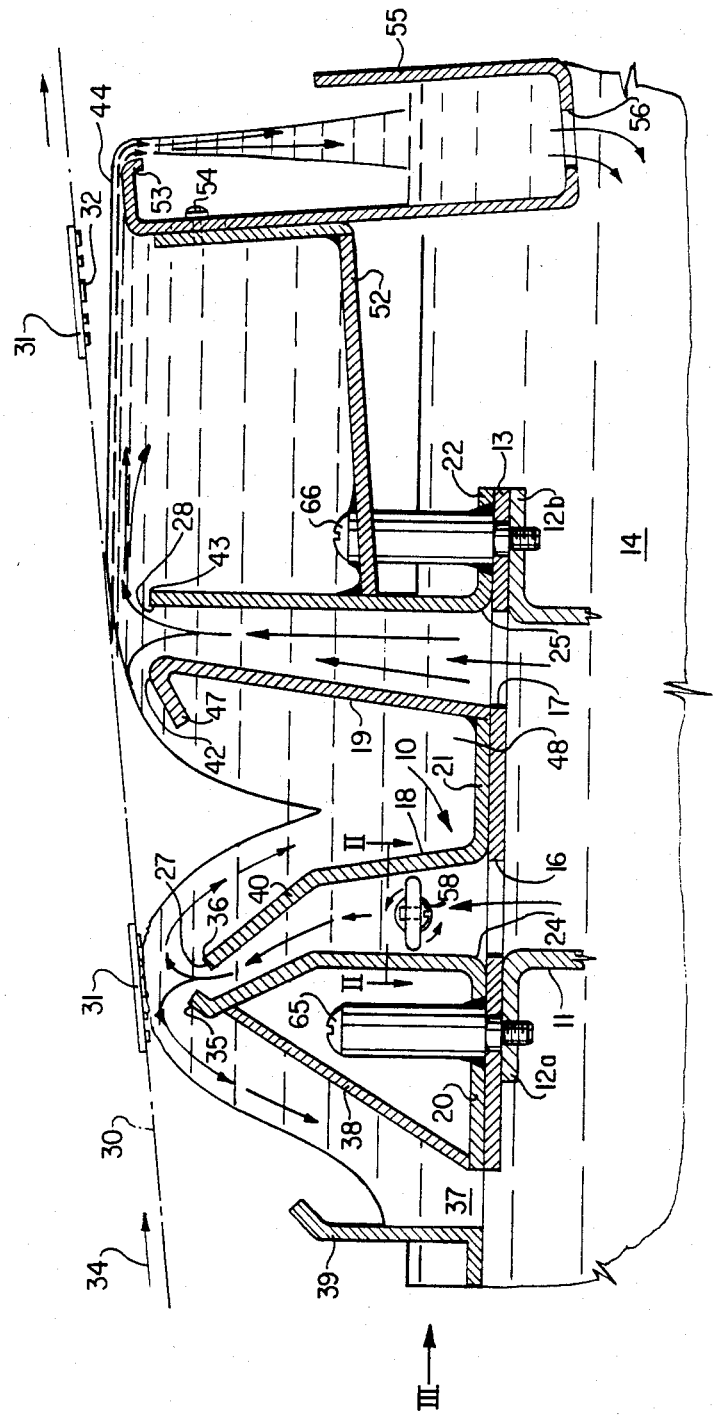
FIG. 1 is a cross-sectional view, some what diagrammatic in form, of a nozzle assembly according to one embodiment of the present invention.

With reference firstly to FIG. 1, a nozzle assembly 10 is shown mounted to a conduit 11 forming part of a wave soldering apparatus such as that illustrated in U.S. Pat. No. 3,198,414 granted on Aug. 3, 1965 to Tardoskegyi. The conduit 11 is elongate and has flanges 12a and 12b at its upper end for connection to a base plate 13 of the nozzle assembly. The method of connecting the base plate 13 to flanges 12a and 12b is shown by fastening screws 65 and 66. As described in the above referenced patent the conduit 11 forms part of a reservoir (not shown) which contains molten solder 14 and which has a pump (not shown) arranged to force solder upwardly in the conduit 11 at a pressure or flow rate depending upon the pump setting. The reservoir is also provided with heaters (not shown) to maintain the solder in a molten condition. As this apparatus, apart from the nozzle assembly, is conventional it will not be described herein in detail: reference may be made, however, to above referenced U.S. Pat. No. 3,198,414 the disclosure of which is hereby incorporated by reference, if further details of the wave soldering apparatus are required.

Base plate 13 has two spaced elongate apertures 16 and 17 which are aligned parallel to each other and parallel with conduit 11. With the nozzle assembly 10 mounted to the conduit 11 apertures 16 and 17 are both positioned within the confines of the conduit and both apertures extend preferably substantially the whole length of conduit 11.

To the upper surface of base plate 13 is attached a pair of elongate nozzles 18 and 19, flat horizontal portions 20, 21 and 22 of the nozzles engaging the base plate 13. Nozzle 18 has a solder inlet 24 aligned with and coextensive with aperture 16 of the base plate 13 and nozzle 19 has a solder inlet 25 aligned with and coextensive with aperture 17 of base plate 13. Nozzle 18 has a solder outlet 27 and nozzle 19 has a solder outlet 28. It should be apparent the nozzle outlets 27 and 28 extend along the nozzles parallel to each other and nozzle inlets 24 and 25.

Nozzle outlet 27 is configured and dimensioned such that the flow of solder there through is turbulent rather than laminar. Additionally, outlet 27 is shown directed somewhat to the right of vertical as seen in FIG. 1 although there may be flow of solder both to the right and to the left of outlet 27 as indicated by the arrows.

Numeral 30 indicates the path of travel of circuit boards 31 which have bonded to their undersides chip components 32 which have contact pads 33 (FIG. 4) which are to be soldered to conductors on the underside of the boards in the wave soldering apparatus. Path 30 slopes upwardly to the right at an angle of preferably between 4° and 7° to the horizontal, the printed circuit boards having lateral marginal portions supported by spaced conveyors (not shown) which carry the boards upwardly as indicated by arrow 34.

As the boards 31 move up path 30 and pass over nozzle outlet 27 from the entry side 35 to exit side 36, the crest of the turbulent solder wave emanating from nozzle outlet 27 contacts the underside of boards 31, the turbulent flow causing solder to be forced into the very small spaces adjacent the contact pads 33 of chip components 32. As described above nozzle outlet 27 is directed somewhat towards the exit side 36 so that the upward turbulent flow is also directed generally towards the exit side. This results in a greater flow of solder down the exit side 36 of the nozzle than the entry side 35.

A guide channel 37 formed by guide plates 38 and 39 guides the solder back from the entry side to the reservoir. Plate 39 is preferably adjustable backwards and forwards to vary the size of channel 37 as desired. The purpose of guide channel 37 is to guide the solder back into the reservoir with a minimum of turbulence thus minimizing the formation of oxide or dross on the solder. This is effected essentially by slowing down the speed of the falling solder compared to the speed it would attain if it fell directly into the reservoir.

On the exit side 36 an angled upper plate portion 40 of the nozzle 18 serves as a guide for the solder.

The outlet 28 of nozzle 19 is configured and dimensioned such that the flow of solder there through is laminar rather than turbulent. In fact, the flow through this nozzle is preferably essentially identical to that described in U.S. Pat. No. 3,921,888 which was granted to Messrs Elliott and Palko on Nov. 25, 1975 the disclosure of which patent is incorporated herein by reference. Thus, the solder wave is smooth and overflows both on the entry side 42 and the exit side 43, there being a greater volumetric flow over the entry side than the exit side. Furthermore, the level 44 of the solder wave on the exit side remains at substantially the same height as the crest of the solder wave emanating from nozzle 19 and the velocity of the solder wave on the exit side is substantially the same as the speed of the circuit boards 31.

Figure 4:
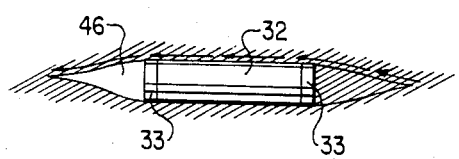
FIG. 4 is a diagrammatic view showing to an enlarged scale the flow of solder over a chip component.

As described fully in above mentioned U.S. Pat. No. 3,921,888, the flow of solder in the entry direction is intended to achieve an efficient application of solder and the flow of solder on the exit side, by virtue of the lack of relative motion between the circuit boards and the solder wave on the exit side is caused to separate from the boards substantially vertically with little or no lateral movement there between so that the formation of bridges or "icicles" is discouraged. Whereas nozzle 19 would work satisfactorily alone in the application of solder to many types of printed circuit board assemblies, nozzle 19 alone does not satisfactorily apply solder to printed circuit boards carrying chip components for the reasons described earlier. FIG. 4 illustrates how the orientation of a chip component would influence the application of solder, by means of nozzle 19 alone, to the contact pads of the chip component. The arrows show the flow of solder engaging a chip component 32 that happened to be aligned parallel to the direction of motion of the board on which the component 32 is mounted. The board motion is, of course, essentially directly opposite to the solder flow direction. As can be seen the leading contact pad 33 is directly impinged by the solder flow but the trailing contact pad 33 is sheltered from the flow which tends to leave a void 46 causing incomplete soldering.

According to the present invention nozzle 19 is supplemented by nozzle 18 so that when a printed circuit board 31 arrives at the crest of the wave from nozzle 19 it has previously been subjected to the turbulent flow from nozzle 18 which has forced some solder into the minute spaces required including voids 46. The slight rearward disposition of nozzle outlet 27 enhances the filling of voids 46. The amount of solder which would be applied by nozzle 18 alone would not be sufficient to provide good connections but this basic soldering action is enhanced by the efficient soldering action of nozzle 19.

Figure 3:
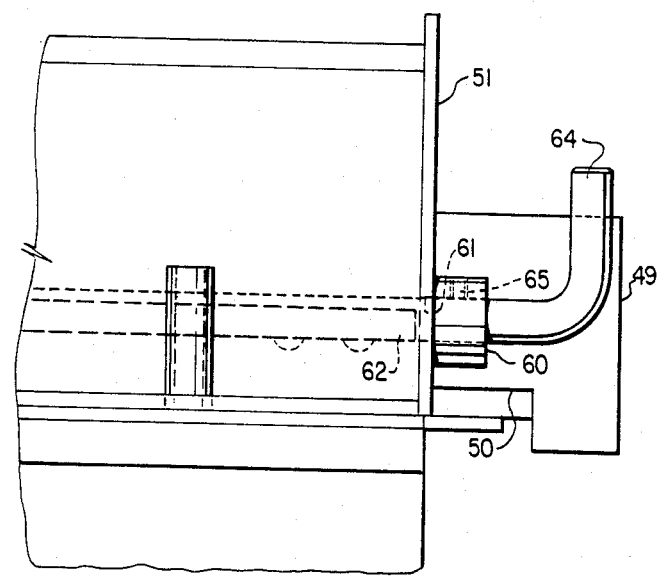
FIG. 3 is a fragmentary view of the nozzle assembly of FIG. 1 looking in the direction of arrow III in FIG. 1.

The entry side 47 of nozzle 19 is formed as a guide plate 47 to guide the wave on the entry side in a smooth, streamlined flow. As can be seen the flow from the entry side of nozzle 19 converges with the flow from the exit side of nozzle 18 and the nozzles form between them a channel 48 receiving this solder. The channel 48 is closed at its bottom by plate portion 21 but attached to each end of channel 48 is a guide box 49, one of which is seen in FIG. 3, which communicate with the channel and are open at their bottom to permit downward flow of the solder back into the reservoir. Boxes 49 are mounted, respectively, on nozzle assembly side plates 51, only one of which is shown in FIG. 3. Boxes 49 serve to return the solder to the reservoir with minimum turbulence thus minimizing the creation of oxides or dross.

It should be apparent that the solder waves on the exit side of nozzle 18 and on the entry side of nozzle 19 should not converge with each other too high up because this could adversely effect the smooth flow properties of the wave from nozzle 19 or cause splashing on the printed circuit boards. In order to avoid this problem the upper portion of nozzle 18 is shown to be angled forwardly thereby increasing the spacing between the outlets of the two nozzles while maintaining a relatively small distance between the inlets of the two nozzles.

Attached to the exit side of nozzle 19 is a tray configured and dimensioned to reduce feedback of flow disturbances as taught more fully in above referenced U.S. Pat. No. 3,921,888. A weir 53 is adjustably attached by screws 54 to a vertical portion of tray 52, the weir being contoured to provide streamlined flow thereover. The lower extremity of the weir is formed as a trough 55 which catches the flow of solder over the weir and leads it back through holes 56 to the reservoir with a minimum of splashing.

An important feature of the present invention is the provision of a flow control means for the control of the flow of solder through nozzle 18. The flow control means may be any suitable gating means such as the butterfly type valve 58 shown in the illustrated embodiment. Valve 58 is shown generally in FIG. 1 and in greater detail in FIGS. 2 and 3. It comprises a rod 59 rotatably received in bushes 60 (only one of which is shown in the drawings) mounted respectively to nozzle assembly side plates 51 which are apertured at 61 to receive the rod therethrough.

Figure 2:
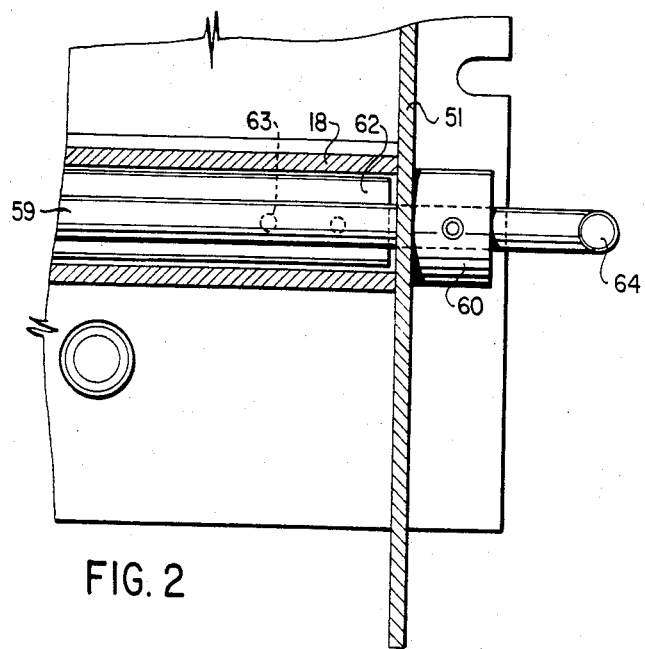
FIG. 2 is a fragmentary sectional view taken on line II—II of FIG. 1.

A flat elongate plate 62 is secured to the underside of the rod 59 by means of screws 63 or other suitable means such as welding. As can be seen in FIG. 2 plate 63 extends substantially the entire length of nozzle 18 and in the orientation shown almost completely blocks the nozzle. Rod 59 projects outside one of the bushes 60 and the free end portion 64 is bent through 90° as shown in FIG. 3. The same bush 60 through which rod 59 projects has a radial tapped hole 65 adapted to receive a set screw, not shown, which can be screwed in to engage the surface of rod 59 and retain it in any desired angular orientation as selected by manually turning free end portion 64 of the rod.

As described above the flow of solder through conduit 11 is controlled by controlling a pump in the reservoir. By adjusting the setting of valve 58 the ratio of solder flow through nozzle 18 with respect to the solder flow through nozzle 19 can be controlled. These two controls permit a very great range of flows to be achieved separately through each nozzle as desired. The actual control settings are determined experimentally by passing samples of printed circuit boards to be soldered through the apparatus with various control settings and examining the quality of the soldered boards. In this way an optimum combination of control settings can be achieved. It should be apparent that as valve 58 is opened the force of solder through nozzle 18 will increase relative to that through nozzle 19 and this will give rise to an increase in height of the crest of the wave from nozzle 18 with respect to that of the wave from nozzle 19. In this way the angle of a line touching the crests of the two waves will vary and the printed circuit board conveyors will have to be adjusted so that the path 30 coincides with that line. The variation in angle will be in the range 4°-7°.

As described above the nozzle 18 is angled such that the outlets 27 and 28 are sufficiently far apart while retaining a smaller distance between inlets 16 and 17. The reason for this is to make the nozzle assembly dimensionally compatible with the dimensions of the conduit 11 on existing wave soldering apparatus designed for a single nozzle. In other words, the distance between the left hand side of nozzle inlet 24 to the right hand side of nozzle inlet 25 is virtually the same as the width of conduit 11.

While a specific embodiment of the invention has been shown and described in detail to illustrate the application of the principles of the invention, it will be understood that the invention may be embodied otherwise without departing from the scope of the invention. For example, nozzle 18 may be configured such that the turbulent wave or jet flows only or almost entirely over the exit side of the nozzle. Furthermore, although surface 44 of the solder wave from nozzle 19 is shown as being virtually horizontal and merging with the wave crest, it is envisaged that the surface 44 could be arranged to slope more and to intersect the portion of the wave which is immediately above nozzle 19 at a point below the crest as taught more specifically in above referenced U.S. Pat. No. 3,921,888.

Although the invention was devised for specific application to the soldering of printed circuit boards carrying leadless chip components as described it is envisaged that the invention could be used for soldering other types of circuit boards where similar problems exist.

What I claim as my invention is:

1. Apparatus for applying solder to exposed metallic surfaces on one face of circuit boards or the like comprising means for conveying circuit boards along an upward sloping path, a reservoir adapted to contain molten solder, a first nozzle communicating with the reservoir and having a solder outlet positioned above the reservoir and having a circuit board entry side and a circuit board exit side, the first nozzle being formed to produce a jet-like solder wave which is upwardly projecting with an initial high pressure gradient for engagement with the lower faces of the circuit board as they pass along the path above the nozzle exit, a second nozzle communicating with the reservoir and having a solder outlet positioned above the reservoir and having a circuit board entry side and a circuit board exit side, the second nozzle being spaced from and positioned downstream of the first nozzle with respect to the direction of conveying of the circuit boards and being formed to produce a smooth laminar solder wave for engagement with the lower faces of the circuit boards as they pass along the path, and means for circulating solder through the nozzles.

2. Apparatus according to claim 1 wherein the solder outlet of the first nozzle is formed to direct the wave upwardly and to have a portion thereof flow forwardly with respect to the direction of circuit board movement whereby a major portion of the solder discharged from the first nozzle flows across the exit side of the first nozzle.

3. Apparatus according to claim 2 wherein the solder outlet of the first nozzle is formed to direct the wave upwardly and to have a portion thereof flow rearwardly with respect to the direction of circuit board movement whereby solder discharged from the first nozzle flows across the entrance side of the first nozzle.

4. Apparatus according to claim 1 wherein the second nozzle forms the laminar wave such that a portion of the wave flows downwardly at the entrance side of the said second nozzle.

5. Apparatus according to claim 4 wherein the remainder of the laminar solder wave exiting from the second nozzle exits less steeply from the second nozzle exit side than from the entry side.

6. Apparatus according to claim 1 or 4 including means independent of the pump means for controlling the flow of solder through the first nozzle.

7. Apparatus according to claim 1 or 4 including adjustable valve means in the first nozzle for controlling the flow of solder through the first nozzle.

8. Apparatus according to claim 1 wherein the first and second nozzles together form a nozzle assembly which is mounted to a single conduit of the reservoir for supplying solder in common to inlets of the two nozzles.

9. Apparatus according to claim 8 wherein at least one of the nozzles is angled such that the distance between the solder outlets is greater than the distance between the inlets.

10. Apparatus according to claim 8 or 9 wherein means for receiving solder are defined by an exit side portion of the first nozzle and an entry side portion of the second nozzle and further comprising guide means at both nozzles lateral of the solder receiving means for guiding solder back into the reservoir.

11. Apparatus according to claim 1 wherein the second nozzle is provided at its exit side with a tray and a weir so configured that feedback of flow disturbances on the solder wave from the second nozzle is reduced and the solder is caused to flow at the exit side in substantially the same direction and at approximately the same speed at the circuit boards.

12. A method of applying solder to one face of each of a plurality of circuit boards or the like having exposed metallic surfaces on the one face comprising passing the circuit boards at a predetermined speed along an upwardly sloping path, with the one face directly downwardly, forming an upwardly projecting jet-like solder wave with an initial high pressure gradient beneath the path such that the one face of the circuit boards enter and exit from the wave whereby some solder is forced onto the metallic surfaces, forming a smooth laminar solder wave downstream of the jet-like wave with respect to the direction of travel of the circuit boards such that the one face of the circuit boards subsequently enter and exit from the smooth solder wave whereby soldering of the metallic surfaces is completed.

13. A method according to claim 12 wherein a greater volumetric portion of the smooth solder wave is permitted to flow downwards on the entry side of the wave.

14. A method according to claim 13 wherein the remaining portion of the smooth solder wave is permitted to flow downwards on the exit side of the wave and is guided in a smooth horizontal or downward sloping stream in substantially the same direction as the circuit boards.

15. A method as in claim 14 wherein remaining portion of the smooth solder wave flows at substantially the same speed as the circuit boards and the circuit boards are withdrawn from the stream such that the relative movement between the stream and the board is substantially vertical.

16. A method according to claim 12 wherein a portion of the jet-like solder wave is directed in a direction opposite the direction of entry of the circuit board.

17. A method as in claim 16 wherein the smooth solder wave extends in the direction of exit of the circuit boards.

18. A method as in claim 12 wherein the smooth solder wave extends in the direction of exit of the circuit boards.

19. A method as in claim 12 wherein the upwardly projecting jet-like solder wave is turbulent.

20. A method of applying solder to one faces of printed circuit boards carrying on their one faces leadless chip components having closely spaced contact pads comprising passing the circuit boards at a predetermined speed along an upwardly sloping path with the one faces directed downwardly, forming an upwardly projecting jet-like solder wave with an initial high pressure gradient beneath the path such that the one faces of the circuit boards enter and exit from the wave whereby some solder is forced onto the metallic surfaces, forming a smooth laminar solder wave downstream of the jet-like wave with respect to the direction of travel of the circuit boards such that the one faces of the circuit boards subsequently enter and exit from the smooth solder wave whereby soldering of the metallic surface is completed.

21. A method according to claim 20 wherein a greater volumetric portion of the smooth solder wave is permitted to flow downwards on the entry side of this wave.

22. A method according to claim 21 wherein the remaining portion of the smooth solder wave is permitted to flow downwards on the exit side of the wave and is guided in a smooth horizontal or downward sloping stream in substantially the same direction as the circuit boards.

23. A method as in claim 22 wherein remaining portion of the smooth solder wave flows at substantially the same speed as the circuit boards and the circuits boards are withdrawn from the stream such that the relative movement between the stream and the board is substantially vertical.

24. Apparatus according to claim 1 including an adjustable butterfly valve disposed in the first nozzle for controlling the flow of solder of the first nozzle.

25. Apparatus according to claim 24 wherein the butterfly valve includes a manually adjustable portion extending exteriorly of the first nozzle.

26. Apparatus according to claim 1 wherein the solder wave produced by said first nozzle is a turbulent jet.

27. Apparatus according to claim 1 where said smooth laminar wave is at the entry side of said second nozzle.

28. Apparatus as in claim 1 wherein the crest of the wave produced by said first nozzle is higher than the crest of the wave produced by said second nozzle.

* * * * *